Figures 1, 2:
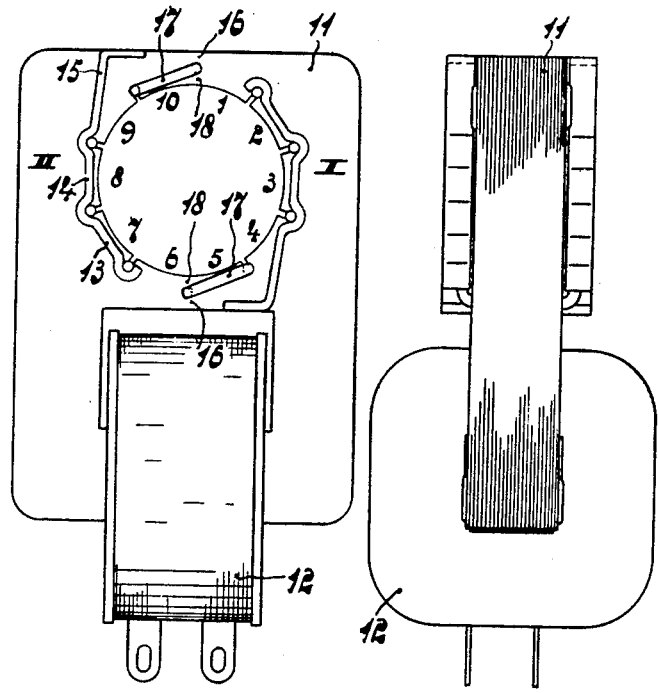

April 10, 1956  B. M. MEIJER  2,741,715

STATOR FOR SINGLE-PHASE INDUCTION MOTOR

Filed June 25, 1954

INVENTOR.
BAREND MARTINUS MEIJER
BY
AGENT

United States Patent Office 2,741,715
Patented Apr. 10, 1956

2,741,715

STATOR FOR SINGLE-PHASE INDUCTION MOTOR

Barend Martinus Meijer, Eindhoven, Netherlands, assignor to Hartford National Bank and Trust Company, Hartford, Conn., as trustee Application June 25, 1954, Serial No. 439,356

Claims priority, application Netherlands July 3, 1953

2 Claims. (Cl. 310—172)

This invention relates to stators for single-phase induction motors with two pole halves, each comprising a number of poles with short-circuiting turns, at least a part of the turns being interconnected and the first two diametrically opposed poles of each pole half being devoid of a short-circuiting turn. Stators of this type are known, for example, from U. S. patent specification 2,467,755 and suffer from the disadvantage that it is very difficult to obtain a rotating field which, with regard to the phase-displacement in time between the several magnetic pole fields, is sufficiently symmetrical to reduce speed variations and vibration of the rotor to a permissible minimum. This is needed for several uses, for example in the case of a driving motor for record players and magnetic recording and reproducing apparatus. In the case of a capacitor motor this is easier since there are two fields displaced in phase by 90° both in place and in time. However, the capacitor motor has the disadvantage of the capacitor as an additional component part which may give rise to disturbances, is comparatively costly and increases the volume and weight of the motor. In addition, when changing over to a different voltage, say from 220 v. to 110 v., the capacity of the capacitor is required to be changed.

The present invention is based on the recognition that a suitable symmetrical rotating field with a single-phase induction motor without capacitor for the aforesaid uses is nevertheless obtainable when fulfilling particular conditions referred to hereinafter.

In accordance with the invention, with a stator of the aforesaid type, each pole half comprises at least five substantially equally long poles equally spaced from one another along the periphery, the last pole of each pole half comprising a separate short-circuiting turn, and each pole half comprises a magnetic shunt between the first pole, devoid of a short-circuiting turn, and both the adjacent last and the penultimate pole of the other pole half, in the last-mentioned case via the other side of the separate short-circuiting turn, whilst all the remaining short-circuiting turns are interconnected.

This allows of fulfilling the condition of a practically symmetrical rotating field with regard to the phase displacement both in space and of time.

According to a further feature of the invention several stator poles are locally shorter than other poles in a radial direction in order to obtain at least substantially equal inductance values all around in the air-gap between the stator and the rotor.

Figure 3:
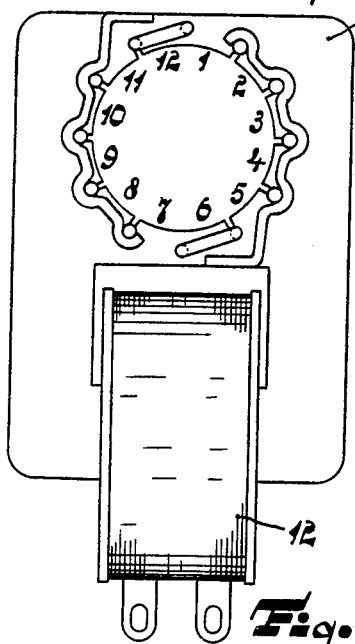

In order that the invention may be readily carried into effect, it will now be described with reference to the accompanying drawing, given by way of example, in which one example thereof is shown diagrammatically and in which Figures 1 and 2 are a front view and a side view respectively of a ten-pole stator and Figure 3 is a front view of a twelve-pole stator according to the invention.

In Figure 1, in which 11 denotes the stator and 12 the coil, the stator poles 1 to 5 form part of one pole half I, while the stator poles 6 to 10 form part of the other pole half II. The first two diametrically opposed poles 1 and 6 of each pole half I and II are not shielded, whilst the poles 2, 3, 4 and 7, 8, 9 respectively comprise interconnected short-circuiting turns.

The condition, according to which the phase-displacement according to place should be symmetrical, is fulfilled by the construction shown in the drawing, since the ten poles provided along the periphery substantially have the same length and are equally spaced from one another. Each pole occupies approximately 36° of the circumference, so that the ten poles jointly occupy 360°.

In order to obtain a symmetrical rotating field—with regard to the phase-displacement in time between the several fields of the poles 6 to 10 of the pole half II— (the same holds for the fields of the poles 1 to 5 of the pole half I) the following phase-displacements according to time should occur (since also in this case the ten poles occupy 360°, the field of each pole must be more displaced in phase by 36° than the field of a preceding pole):

$\alpha_1$ between pole 6 and pole 7 = 36°
$\alpha_2$ between pole 6 and pole 8 = 72°
$\alpha_3$ between pole 6 and pole 9 = 108°
$\alpha_4$ between pole 6 and pole 10 = 144°
$\alpha_5$ between pole 6 and pole 1 = 180°
$\alpha_5$ between the two non-shielded poles 6 and 1 naturally being obtained automatically, since said two poles are magnetically connected directly to the two ends of the coil 12.

In practice, no difficulties have been found to occur to obtain phase-displacements of 36° between the non-shielded pole 6 and pole 7 and of 72° between pole 6 and pole 8 by a suitable choice of the interconnected short-circuiting turns 13 and 14. In spite of the fact that the pole 9 also comprises a short-circuiting winding 15 attempts to obtain a phase-displacement of 108° between the pole 6 and the pole 9 have failed. By interconnecting also said short-circuiting turns, thus raising the phase-displacement as much as possible, 85° could be attained. Now a further increase of said phase-angle is secured artificially by coupling the pole 9 directly to the field of pole 1 by means of a suitable magnetic shunt 16. In fact, the last-mentioned field is displaced in phase by 180° with regard to the field of pole 6. This means that the phase-displacement between the fields of pole 1 and pole 9 is 180°−85°=95° which permits, by means of a suitably proportioned shunt 16, the phase-displacement of pole 9 to be raised from 85° to 108°.

Because of the required shunt 16 the pole 10 must be surrounded by a separate short-circuiting turn 17 of such a size as to permit the phase-displacement to be raised as much as possible. Although the phase-displacement of the field of pole 10 is also promoted by the field from pole 1 via the shunt 16, this has proved to be insufficient. However, said phase-displacement could practically be raised to the required 144° with the use of a second shunt 18 direct between the pole 10 and the pole 1, similarly as obtained for the pole 9 by means of the direct magnetic coupling between pole 9 and pole 1 through the shunt 16.

The pole half I corresponds to the pole half II.

Consequently, this yields a rotating field which is practically exactly symmetrical both according to place and to time.

A third condition is, however, that for maximum freedom from vibration of the rotor the maximum field strength in the air-gap should be as equal as possible for each pole. Since the rotor bearing practically always has a little play, the rotor will be subjected to uneven forces of attraction as a result of different field strengths in the air-gaps of the pole, and thus be caused to vibrate. In the case of very accurately fitting bearings, said vibration can often be reduced to a permissible minimum.

Figure 3 shows an example of a stator according to the invention, which comprises six poles per pole half, that is to say in all twelve poles. The phase-displacements between two successive poles must then consequently be 30°.

What is claimed is:

1. A single phase induction motor comprising a stator with two main poles, each main pole including at least five auxiliary poles of substantially equal length and being substantially equally spaced from one another, a predetermined number of auxiliary poles carrying short-circuited turns except the first diametrically opposed auxiliary poles respectively of each pole half, at least a part of the turns of each main pole being interconnected, the last auxiliary pole of each main pole being provided with a separate short-circuiting turn, and each main pole including a magnetic shunt between the first auxiliary pole and the adjacent last and penultimate auxiliary pole of the other main pole through said separate-circuiting turn, the remaining short-circuiting turns of each main pole being interconnected.

2. A single phase induction motor as set forth in claim 1 wherein each of the two main poles includes six auxiliary poles of substantially equal length and being substantially equally spaced from one another.

References Cited in the file of this patent

UNITED STATES PATENTS

| | | |
|---|---|---|
| 1,949,968 | Lilja | Mar. 6, 1934 |
| 2,062,322 | Lilja | Dec. 1, 1936 |
| 2,487,258 | Morris | Nov. 8, 1949 |
| 2,490,905 | Hardie | Dec. 13, 1949 |
| 2,492,207 | Ballentine | Dec. 27, 1949 |
| 2,606,223 | Burian | Aug. 5, 1952 |

FOREIGN PATENTS

| | | |
|---|---|---|
| 1,480 | Great Britain | of 1889 |